United States Patent
Ratasuk et al.

(10) Patent No.: US 11,800,495 B2
(45) Date of Patent: Oct. 24, 2023

(54) POWER SAVING FOR REDUCED CAPABILITY DEVICES

(71) Applicant: NOKIA TECHNOLOGIES OY, Espoo (FI)

(72) Inventors: Rapeepat Ratasuk, Inverness, IL (US); Nitin Mangalvedhe, Hoffman Estates, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 203 days.

(21) Appl. No.: 17/402,061

(22) Filed: Aug. 13, 2021

(65) Prior Publication Data

US 2023/0049628 A1    Feb. 16, 2023

(51) Int. Cl.
| | |
|---|---|
| *H04W 72/04* | (2023.01) |
| *H04W 72/044* | (2023.01) |
| *H04W 72/231* | (2023.01) |
| H04W 76/10 | (2018.01) |
| H04W 28/20 | (2009.01) |

(52) U.S. Cl.
CPC ....... *H04W 72/044* (2013.01); *H04W 72/231* (2023.01); *H04W 28/20* (2013.01); *H04W 76/10* (2018.02)

(58) Field of Classification Search
CPC . H04W 72/044; H04W 72/231; H04W 76/10; H04W 28/20
See application file for complete search history.

(56) References Cited

U.S. PATENT DOCUMENTS

| | | | |
|---|---|---|---|
| 9,877,278 B2 | 1/2018 | Sartori et al. | |
| 2019/0174518 A1* | 6/2019 | Jiang | H04W 72/1268 |
| 2019/0261405 A1* | 8/2019 | Ang | H04W 72/23 |
| 2019/0327785 A1* | 10/2019 | Li | H04W 52/0219 |
| 2019/0357085 A1 | 11/2019 | Chervyakov et al. | |
| 2020/0187293 A1* | 6/2020 | Kuang | H04W 72/0453 |

(Continued)

FOREIGN PATENT DOCUMENTS

| | | | | |
|---|---|---|---|---|
| EP | 3817302 A1 * | 5/2021 | ......... | H04L 12/4035 |
| WO | 2020/172300 A1 | 8/2020 | | |
| WO | 2021/146998 A1 | 7/2021 | | |

OTHER PUBLICATIONS

International Search Report and Written Opinion issued in corresponding International Application No. PCT/FI2022/050355 dated Aug. 30, 2022.

(Continued)

*Primary Examiner* — Maharishi V Khirodhar
*Assistant Examiner* — Kenneth P Hunt
(74) *Attorney, Agent, or Firm* — SQUIRE PATTON BOGGS (US) LLP (57) ABSTRACT

Systems, methods, apparatuses, and computer program products for power saving for reduced capability devices. The method may include receiving a higher layer configuration from a network element. The higher layer configuration may include a slot type configuration for at least one of a first bandwidth communication and a second bandwidth communication. The method may also include performing, based on the higher layer configuration, in a certain slot, data communication with the network element under one of the first bandwidth communication or the second bandwidth communication.

15 Claims, 7 Drawing Sheets

(56) References Cited

U.S. PATENT DOCUMENTS

| | | | | |
|---|---|---|---|---|
| 2020/0205219 A1* | 6/2020 | Chen | ...................... | H04W 76/19 |
| 2020/0252949 A1* | 8/2020 | Kim | ................... | H04W 72/0453 |
| 2021/0168849 A1* | 6/2021 | Oh | ........................ | H04L 5/0053 |
| 2023/0106166 A1* | 4/2023 | Oteri | ..................... | H04L 5/0094 |
| | | | | 370/329 |

OTHER PUBLICATIONS

Vivo, "Motivation for NR Diverse UE Types in Rel-17", 3GPP TSG RAN Meeting #84, Newport Beach, USA, Jun. 3-6, 2019, RP-191305, 3 pages.

Nokia, Nokia Shanghai Bell, "On Wideband Operation in NR-U", 3GPP TSG RAN WG1 Meeting #96bis, Xi'an, China, Apr. 8-12, 2019, R1-1904194, 15 pages.

ATIS Standard, ATIS 3GPP Specification, ATIS.3GPP.38.840. V1600, 3rd Generation Partnership Project; Technical Specification Group Radio Access Network; NR; Study on User Equipment (UE) power saving in NR (Release 16), 74 pages.

\* cited by examiner

|  | FR1 | | FR2 | |
| --- | --- | --- | --- | --- |
|  | Reference NR UE | RedCap UE | Reference NR UE | RedCap UE |
| Device Bandwidth | 100 MHz | 20 MHz | 200 MHz | 100 MHz |
| Antenna Config | FDD: 1Tx-2Rx TDD: 1Tx-4Rx | 1Tx-1Rx, 1Tx-2Rx | 1Tx-2Rx | 1Tx-1Rx 1Tx-2Rx |
| DL MIMO Support | Yes | Yes for 2Rx | Yes | Yes for 2Rx |
| Duplex Operation | FD-FDD, TDD | FD-FDD, TDD, HD-FDD | TDD | TDD |
| Maximum Modulation | DL: 256-QAM UL: 64-QAM | DL: 256-QAM (optional), 64-QAM mandatory UL: 64-QAM | DL: 64-QAM UL: 64-QAM | DL: 64-QAM UL: 64-QAM |
| Peak data rates | N/A | FD-FDD, 1Rx: 85 Mbps DL, 91 Mbps UL | N/A | 50:50 DL/UL, 1Rx: 212 Mbps DL, 228 Mbps UL |
| Complexity Reduction | - | ~50-60% (1Rx) | - | ~50% (1Rx) |

POWER SAVING FOR REDUCED CAPABILITY DEVICES

FIELD

Some example embodiments may generally relate to mobile or wireless telecommunication systems, such as Long Term Evolution (LTE) or fifth generation (5G) new radio (NR) access technology, or other communications systems. For example, certain example embodiments may relate to apparatuses, systems, and/or methods for power saving for reduced capability devices.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

Some example embodiments may be directed to a method. The method may include receiving a higher layer configuration from a network element. According to certain example embodiments, the higher layer configuration may include a slot type configuration for at least one of a first bandwidth communication and a second bandwidth communication. The method may also include performing, based on the higher layer configuration, in a certain slot, data communication with the network element under one of the first bandwidth communication or the second bandwidth communication.

Other example embodiments may be directed to an apparatus. The apparatus may include at least one processor and at least one memory including computer program code. The at least one memory and computer program code may also be configured to, with the at least one processor, cause the apparatus at least to receive a higher layer configuration from a network element. According to certain example embodiments, the higher layer configuration may include a slot type configuration for at least one of a first bandwidth communication and a second bandwidth communication. The apparatus may also be caused to perform, based on the higher layer configuration, in a certain slot, data communication with the network element under one of the first bandwidth communication or the second bandwidth communication.

Other example embodiments may be directed to an apparatus. The apparatus may include means for receiving a higher layer configuration from a network element. According to certain example embodiments, the higher layer configuration may include a slot type configuration for at least one of a first bandwidth communication and a second bandwidth communication. The apparatus may also include means for performing, based on the higher layer configuration, in a certain slot, data communication with the network element under one of the first bandwidth communication or the second bandwidth communication.

In accordance with other example embodiments, a non-transitory computer readable medium may be encoded with instructions that may, when executed in hardware, perform a method. The method may include receiving a higher layer configuration from a network element. According to certain example embodiments, the higher layer configuration may include a slot type configuration for at least one of a first bandwidth communication and a second bandwidth communication. The method may also include performing, based on the higher layer configuration, in a certain slot, data communication with the network element under one of the first bandwidth communication or the second bandwidth communication.

Other example embodiments may be directed to a computer program product that performs a method. The method may include receiving a higher layer configuration from a network element. According to certain example embodiments, the higher layer configuration may include a slot type configuration for at least one of a first bandwidth communication and a second bandwidth communication. The method may also include performing, based on the higher layer configuration, in a certain slot, data communication with the network element under one of the first bandwidth communication or the second bandwidth communication.

Other example embodiments may be directed to an apparatus that may include circuitry configured to receive a higher layer configuration from a network element. According to certain example embodiments, the higher layer configuration may include a slot type configuration for at least one of a first bandwidth communication and a second bandwidth communication. According to other example embodiments, the apparatus may include circuitry configured to perform, based on the higher layer configuration, in a certain slot, data communication with the network element under one of the first bandwidth communication or the second bandwidth communication.

Certain example embodiments may be directed to a method. The method may include transmitting a higher layer configuration to a user equipment. According to certain example embodiments, the higher layer configuration may include a slot type configuration for at least one of a first bandwidth communication and a second bandwidth communication. The method may also include performing, based on the higher layer configuration, in a certain slot, data communication with the user equipment under one of the first bandwidth communication or the second bandwidth communication.

Other example embodiments may be directed to an apparatus. The apparatus may include at least one processor and at least one memory including computer program code. The at least one memory and computer program code may be configured to, with the at least one processor, cause the apparatus at least to transmit a higher layer configuration to a user equipment. According to certain example embodiments, the higher layer configuration may include a slot type configuration for at least one of a first bandwidth communication and a second bandwidth communication. The apparatus may also be caused to perform, based on the higher layer configuration, in a certain slot, data communication with the user equipment under one of the first bandwidth communication or the second bandwidth communication.

Other example embodiments may be directed to an apparatus. The apparatus may include means for transmitting a higher layer configuration to a user equipment. According to certain example embodiments, the higher layer configuration may include a slot type configuration for at least one of a first bandwidth communication and a second bandwidth communication. The apparatus may also include means for performing, based on the higher layer configuration, in a certain slot, data communication with the user equipment under one of the first bandwidth communication or the second bandwidth communication.

In accordance with other example embodiments, a non-transitory computer readable medium may be encoded with instructions that may, when executed in hardware, perform a method. The method may include transmitting a higher layer configuration to a user equipment. According to certain example embodiments, the higher layer configuration may include a slot type configuration for at least one of a first bandwidth communication and a second bandwidth communication. The method may also include performing, based on the higher layer configuration, in a certain slot, data communication with the user equipment under one of the first bandwidth communication or the second bandwidth communication.

Other example embodiments may be directed to a computer program product that performs a method. The method may include transmitting a higher layer configuration to a user equipment. According to certain example embodiments, the higher layer configuration may include a slot type configuration for at least one of a first bandwidth communication and a second bandwidth communication. The method may also include performing, based on the higher layer configuration, in a certain slot, data communication with the user equipment under one of the first bandwidth communication or the second bandwidth communication.

Other example embodiments may be directed to an apparatus that may include circuitry configured to transmit a higher layer configuration to a user equipment. According to certain example embodiments, the higher layer configuration may include a slot type configuration for at least one of a first bandwidth communication and a second bandwidth communication. The apparatus may also include circuitry configured to perform, based on the higher layer configuration, in a certain slot, data communication with the user equipment under one of the first bandwidth communication or the second bandwidth communication.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for power saving for reduced capability devices.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Figure 1:
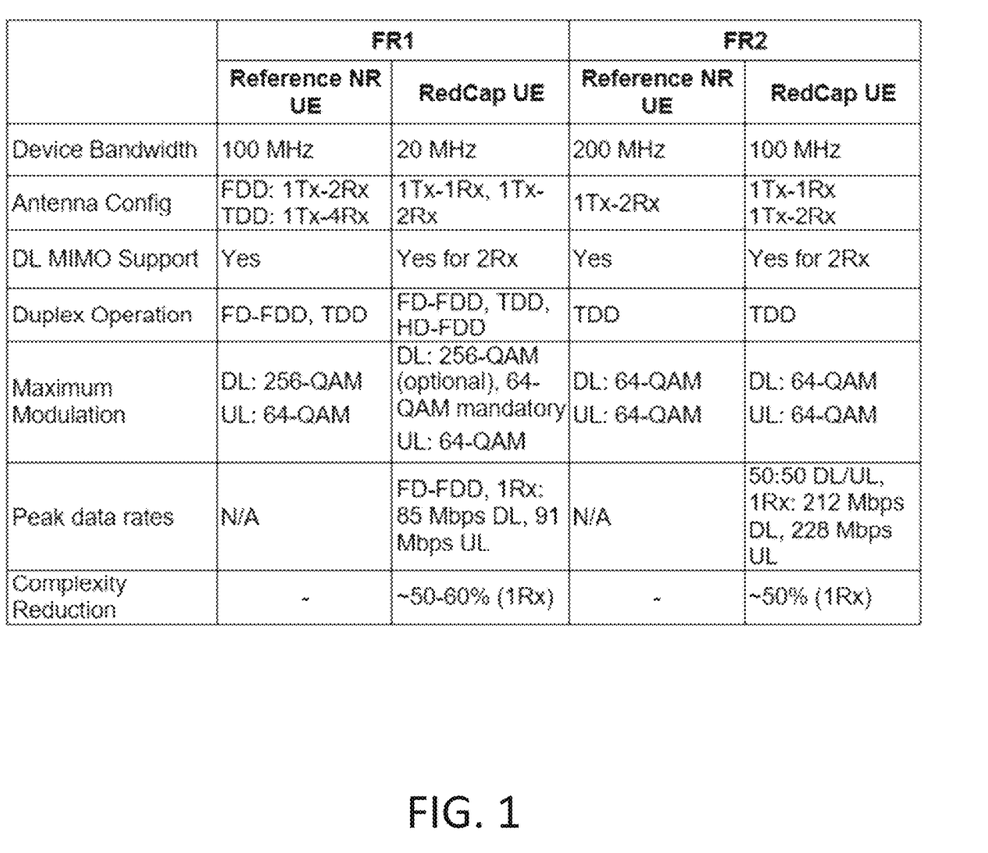
FIG. 1 illustrates a table summary of reduced capability (RedCap) user equipment (UE).

FIG. 1 illustrates a table summary of reduced capability (RedCap) user equipment (UE). $3^{rd}$ Generation Partnership Project (3GPP) introduces RedCap new radio (NR) devices. In particular, RedCap devices have lower cost and complexity compared to other NR devices, and are intended for Internet of Things (IoT) use cases such as industrial sensors, wearables, and video transmissions. As described in 3GPP, RedCap UE may have a maximum bandwidth (BW) of 20 MHz in frequency range 1 (FR1), and 100 MHz in frequency range 2 (FR2).

Power consumption at the UE may be directly related to the received BW of the UE. The relationship between power consumption and BW may be given by a scaling formula as X MHz=0.4+0.6*(X−20)/80. For example, if RedCap UE monitors 5 MHz instead of 20 MHz, it can save 30% power consumption in downlink (DL). One way to reduce power consumption may be to configure a small BW part (BWP) for the UE (e.g., 5 MHz in FR1). This may reduce power consumption both at the radio frequency (RF) and baseband components of the UE at the expense of data throughput and peak data rates. In case of a large amount of data to be transmitted, or the need for high data rates, the UE can be switched to a larger BWP (e.g., 20 MHz). However, this BWP switching may be relatively slow and inefficient.

Another approach may be to configure the UE with a reduced BW core resource set (CORESET) to monitor the physical downlink control channel (PDCCH) (e.g., 5 MHz CORESET in 20 MHz BWP) while allowing data transmission/reception in the full BWP. This approach, however, does not reduce power consumption as the RF is still receiving 20 MHz since the data transmission physical downlink shared channel/physical uplink shared channel (PDSCH/PUSCH), as well as channel measurements including, for example, channel state information reference signal (CSI-RS), may still be for the entire 20 MHz.

Furthermore, a characteristic of RedCap traffic is that it may be UL-centric and somewhat periodic (e.g., video transmission, sensor reports, etc.). The UE may also not be expected to have large DL data. Examples of typical DL reception may include transmission control protocol/internet protocol (TCP/IP) acknowledgment (ACK) and radio resource control (RRC) messages (e.g., PDSCH), CSI-RS for channel measurements, synchronization signal block (SSB), and downlink control information (DCI) (e.g., PDCCH). In certain cases, a considerable amount of DL data may be in response to UL data transmission. Thus, it may be desirable to provide a power saving method such that the UE can use reduced BW, but may be occasionally configured to use large BW in UL/DL for faster transmission/reception.

Certain example embodiments may use bitmap and switching conditions. For instance, in certain example embodiments, it may be possible to configure a narrowband CORSET in a wideband BWP for the UE to monitor, and introduce conditions (i.e., dynamic) or bitmap (i.e., semi-static) to indicate whether the slot type is a wideband slot or a narrowband slot. In some example embodiments, the narrowband slot may be defined in frequency by the CORESET frequency configuration.

Figure 2:
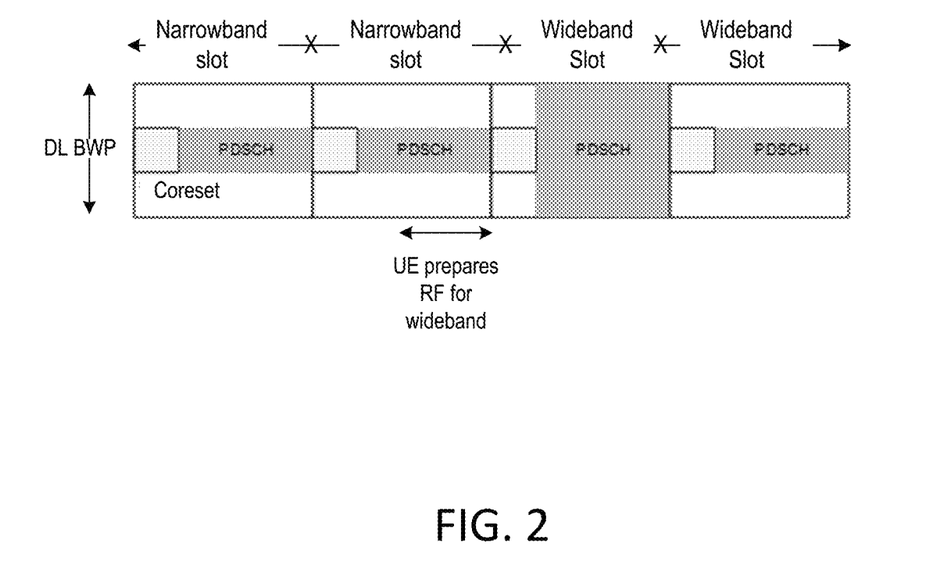
FIG. 2 illustrates an example of narrowband and wideband slots.

According to certain example embodiments, in the narrowband slot, the UE may only be scheduled to transmit or receive (i.e., PDSCH/PUSCH) in a narrowband defined by the CORESET. According to other example embodiments, in a wideband slot, the UE may be scheduled to transmit or receive (i.e., PDSCH/PUSCH) in a wideband BWP. This is illustrated in FIG. 2, which illustrates an example of narrowband and wideband slots.

In certain example embodiments, as part of connection setup, the network may configure a narrowband CORESET (e.g., 5 MHz CORESET in 20 MHz BWP), and indicate that the UE is only to be scheduled within the CORESET except when certain conditions are met. When the certain conditions are met, the UE may be scheduled in wideband. In some example embodiments, an equivalent PUSCH frequency range may be determined from the CORESET. For example, for time division duplex (TDD), the PUSCH frequency range may be the same as the PDSCH by default. However, for frequency division duplex (FDD), the PUSCH frequency range may be PDSCH frequency range+cell-specific offset+UE-specific offset. According to certain example embodiments, the UE-specific offset may provide some load balancing in the UL since IoT traffic may be uplink-centric.

In other example embodiments, the conditions may include frequency domain resource assignment (FDRA) in DCI. For instance, the FDRA in the DCI may be based on the full BWP (i.e., no change to the DL BWP size assumption in the DCI), but the UE may translate the assignment for reception within the narrower BW. Alternatively, in other example embodiments, the FDRA in the DCI may use the narrower CORESET size in place of the DL BWP size for allocation within the narrower BW, which would require fewer bits. Further, in some example embodiments, different groups of UEs may be configured with different CORESETs for load-balancing.

According to certain example embodiments, the network may configure the conditions for which the UE may be scheduled within the entire BWP. For instance, according to certain example embodiments, a bitmap may be provided for the UE to indicate which slots are narrowband, and which slots are wideband. In some example embodiments, the bitmap pattern may be based on data periodicity (e.g., similar to configured grant transmission). The bitmap may also provide a burst of wideband slots to handle bursty traffic corresponding to traffic that arrives in bursts (i.e., multiple packets arriving within a short time of each other). For instance, an additional enhancement may be to extend the wideband slots (i.e., override the bitmap) when there is on-going data transmission. In certain example embodiments, when there is on-going data transmission or scheduling of data communication, the gNB may have the data buffer status so that it can know whether there are more data to be transmitted to/received from the UE (e.g., there may be more than one transmission and reception of communication data). Furthermore, in other example embodiments, the bitmap may be configured based on data traffic characteristics. According to certain example embodiments, if the traffic is delay-tolerant, then the bitmap may not be needed.

In certain example embodiments, the wideband slot(s) may be triggered based on a scheduling request (SR) by the UE. For example, if the UE transmits SR in slot N, then slots N+1 to N+11 may be wideband slots. This allows fast data transmission by the UE, and fast TCP/IP ACK by the network. An additional enhancement may be to extend the wideband slots when there is on-going data transmission. This condition may be based on the expectation that RedCap traffic is typically uplink-centric, and initiated by UL data transmission.

According to certain example embodiments, wideband slot(s) may be triggered based on connected mode discontinuous reception (DRX) cycle. For instance, after a long DRX cycle (which is typically configured together with a short DRX cycle such that it is an integer multiple of the short DRX cycle, where the duration of the long DRX cycle may be 10 ms or longer), the UE may be configured with wideband slots for a certain period of time before falling back to narrowband slots. This may be under the expectation that the UE is more likely to have data transmission or reception at the beginning of the DRX ON duration, especially after a long sleep period.

In other example embodiments, wideband slot(s) may be dynamically triggered by an indication in the DCI. For instance, one of the bits saved from the FDRA indication based on the smaller CORESET size may be repurposed to indicate triggering. Additionally, the wideband slot(s) may be configured to expire after a pre-configured number of slots after which the DCI must again trigger wideband slot operation, if necessary.

According to certain example embodiments, the condition (s) to transmit or receive using wideband BWP may be separated (i.e., the switching condition may be independently configured between UL and DL; it may be the same condition for PDSCH and PUSCH, or a different condition for each) between PDSCH/PUSCH. For example, in some example embodiments, PUSCH may always be scheduled in wideband BWP, whereas PDSCH may only be scheduled within CORESET except under certain conditions. Further, PUSCH allocation may be such that the UE has sufficient time to transition between narrowband and wideband in the RF/baseband.

In some example embodiments, certain restrictions may be needed on the transition between narrowband and wideband slots. For example, a retuning time between 50-200 μs may be needed. This may be handled via implementation, or the UE may skip receiving DL symbols at the end of the slot. Alternatively, in other example embodiments, one or more delays with which the wideband slot(s) becomes effective (current slot, delay of one slot, etc.) may be configured in RRC, and one of the delays may be indicated in DCI.

Figure 3:
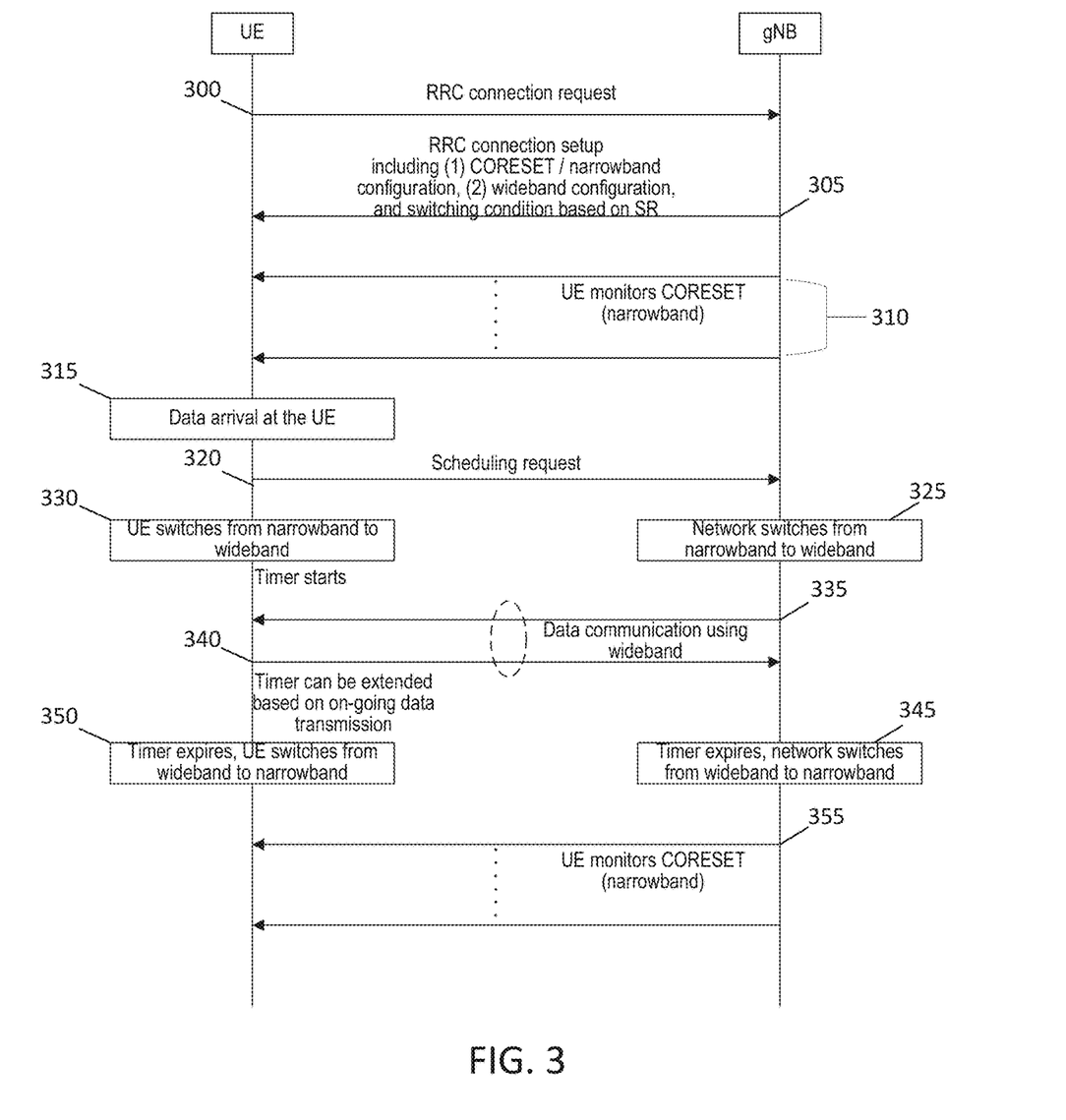
FIG. 3 illustrates an example signal flow diagram for narrowband/wideband switching based on scheduling request (SR), according to certain example embodiments.

FIG. 3 illustrates an example signal flow diagram for narrowband/wideband switching based on SR, according to certain example embodiments. At 300, the UE may transmit an RRC connection request to the gNB. In response to the RRC connection request, the gNB may at 305, transmit an RRC connection setup configuration to the UE. According to certain example embodiments, the RRC connection setup configuration may include at least one of a CORESET/ narrowband configuration, a wideband configuration, and switching conditions based on an SR. According to certain example embodiments, the mode of operating under narrowband communication or wideband communication may occur after the connection setup is completed for the UE (and may be based on the narrowband configuration and wideband configuration provided during operation 305). Before the connection setup, there may be no restrictions on reception, although the UE may monitor the control channel (in a CORESET that may or may not occupy a wide BW part) for paging most of the time. According to other example embodiments, the UE may be in normal (i.e., wideband) communication when it makes the connection request. The gNB may then configure the UE to go into narrowband mode. At 310, the UE may monitor the CORESET (e.g., narrowband). At 315, the UE may detect that data transmission from the gNB has arrived, after which, at 320, the UE may transmit a SR to the gNB. At 325 and 330, the SR may trigger the UE and the gNB to switch from using the narrowband slot to using the wideband slot for data transmission. According to certain example embodiments, a timer may start after the UE and the gNB switch from narrowband to wideband. At 335 and 340, data communication between the UE and the gNB using the wideband slot may commence. In certain example embodiments, the timer may be extended when there is on-going data transmission (e.g., when there is data transmission between the UE and gNB). After the timer expires, at 345 and 350, the UE and gNB may switch from the wideband slot to the narrowband slot. At 355, the UE may monitor the CORESET in the narrowband slot, similar to operation 310.

Figure 4:
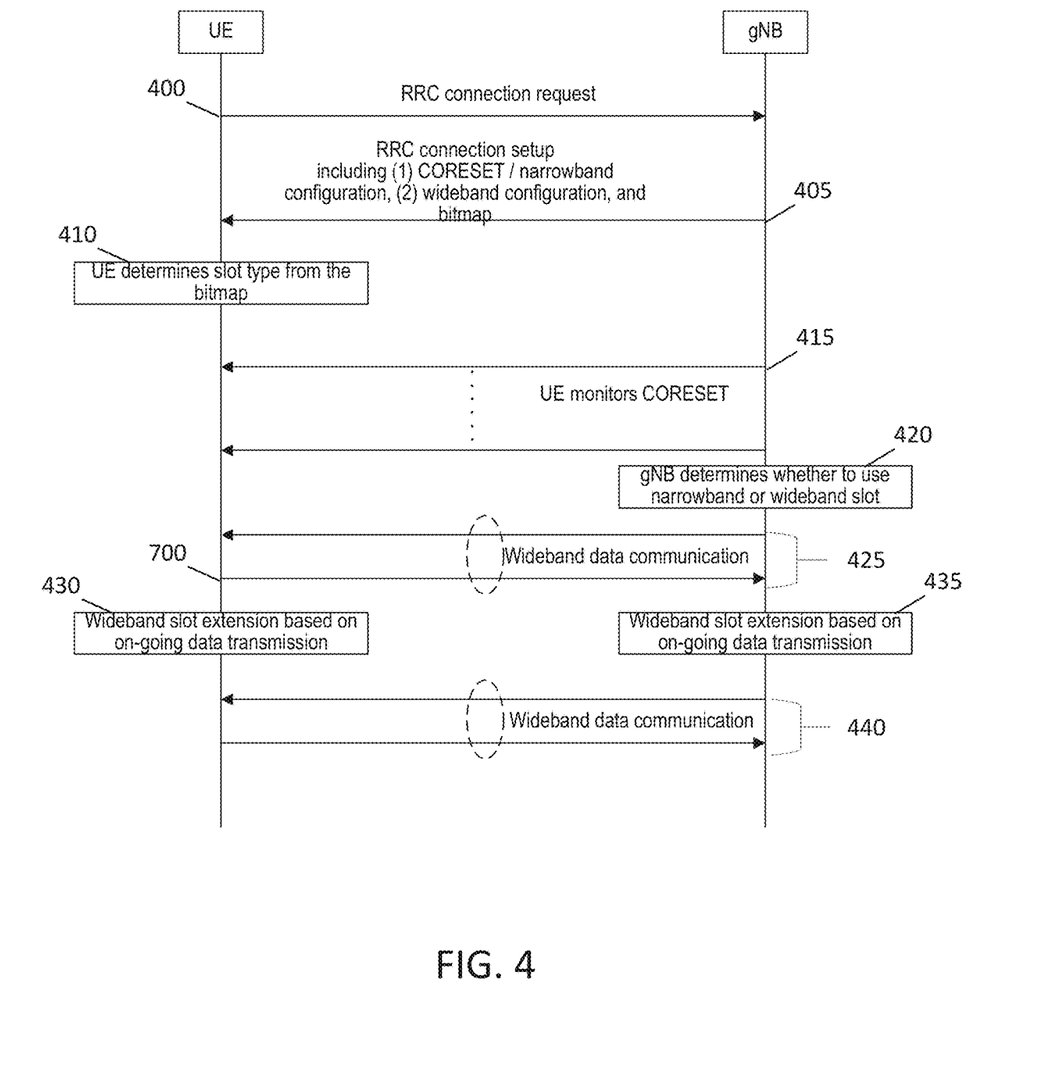
FIG. 4 illustrates an example signal flow diagram for narrowband/wideband switching based on a predefined bitmap, according to certain example embodiments.

FIG. 4 illustrates an example signal flow diagram for narrowband/wideband switching based on a predefined bitmap, according to certain example embodiments. At 400, the UE may transmit a RRC connection request to the gNB. At 405, the gNB may transmit a RRC connection setup configuration to the UE in response to the RRC connection request. According to certain example embodiments, the RRC connection setup configuration may include at least one of a CORESET/narrowband configuration, wideband configuration, and a bitmap. At 410, the UE may determine a slot type form the bitmap. For example, the bitmap may indicate to the UE which slots are narrowband and which slots are wideband. At 415, the UE may monitor the CORESET, and at 420, the gNB may determine whether to use the narrowband slot or the wideband slot. At 425, the UE and gNB may engage in wideband data communication. As a result of the wideband data communication, at 430 and 435, the UE and gNB may extend the wideband slot based on on-going data transmission. For instance, in certain example embodiments, the wideband slots may be extended (i.e., override the bitmap; each slot may be compared with the bitmap to determine whether it is a wideband slot or not) when there is on-going data transmission (e.g., when there is data transmission between the UE and gNB). At 440, the UE and the gNB may continue to engage in wideband data communication. According to certain example embodiments, the UE and the gNB may continue to engage in wideband data communication until the bitmap indicates that the current slot is a narrowband slot, after which the data communication reverts back to narrowband operation.

Figure 5:
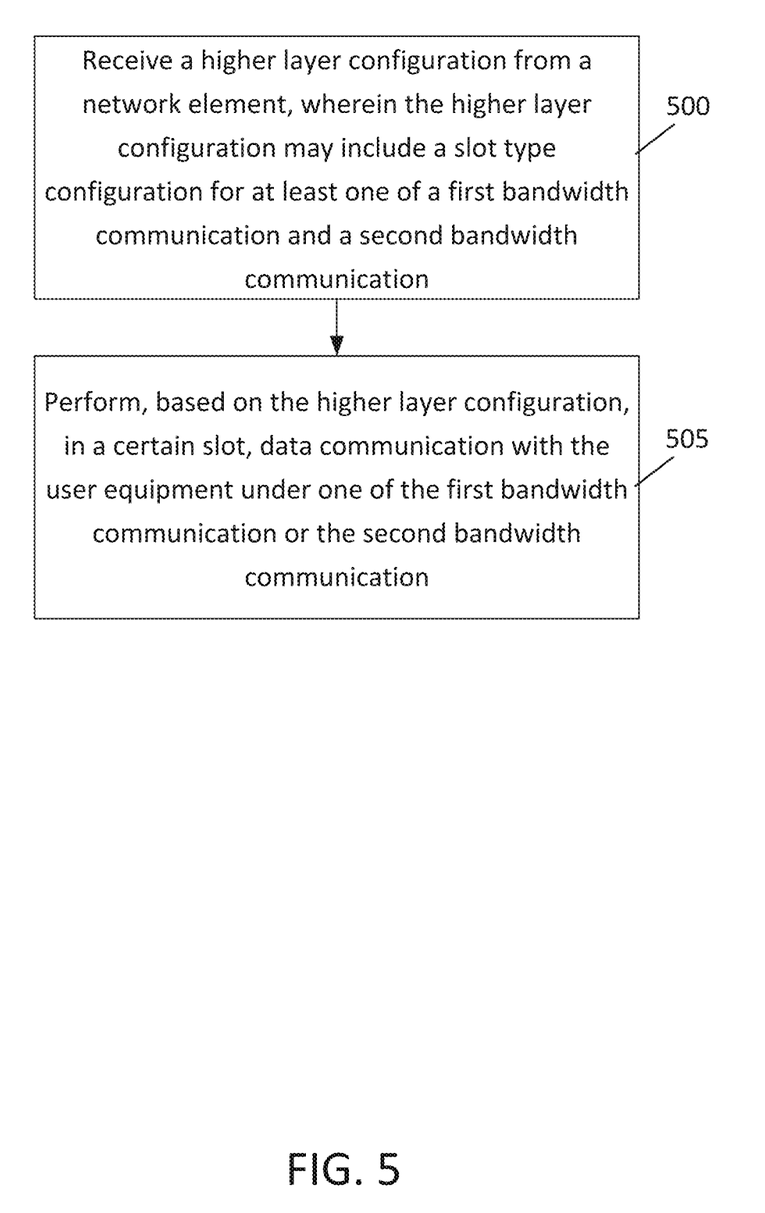
FIG. 5 illustrates an example flow diagram of a method, according to certain example embodiments.
Figure 7A:
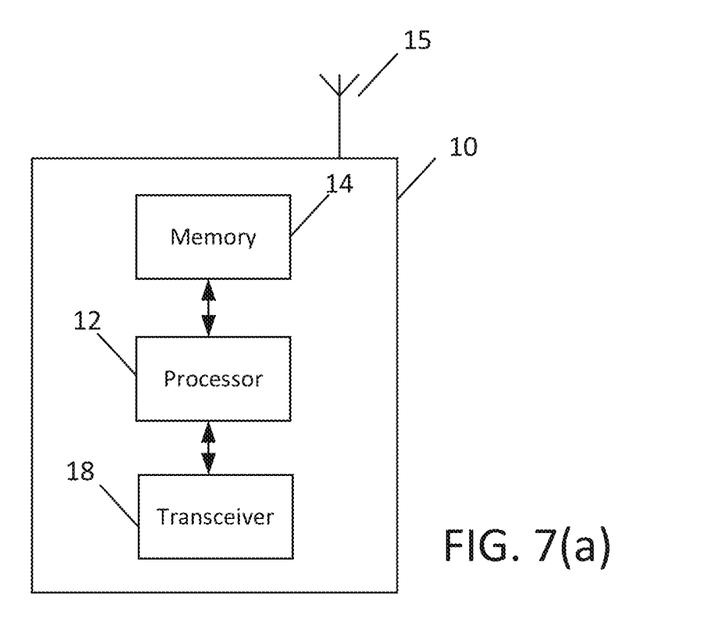
FIG. 7(a) illustrates an apparatus, according to certain example embodiments.
Figure 7B:
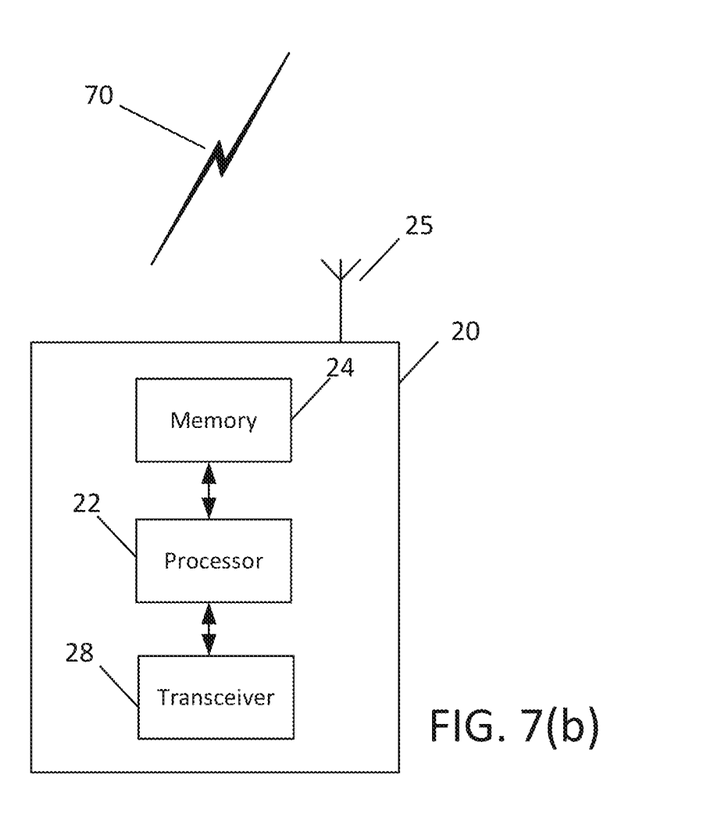
FIG. 7(b) illustrates another apparatus, according to certain example embodiments.

FIG. 5 illustrates an example flow diagram of a method, according to certain example embodiments. In an example embodiment, the method of FIG. 5 may be performed by a network entity, or a group of multiple network elements in a 3GPP system, such as LTE or 5G-NR. For instance, in an example embodiment, the method of FIG. 5 may be performed by a UE similar to one of apparatuses 10 or 20 illustrated in FIGS. 7(*a*) and 7(*b*).

According to certain example embodiments, the method of FIG. 5 may include, at 500, receiving a higher layer configuration from a network element, wherein the higher layer configuration comprises a slot type configuration for at least one of a first bandwidth communication and a second bandwidth communication. At 505, the method may include performing, based on the higher layer configuration, in a certain slot, data communication with the network element under one of the first bandwidth communication or the second bandwidth communication.

According to certain example embodiments, the higher layer configuration may include at least one of a connection setup configuration, a connection resume configuration, and a reconfiguration. According to some example embodiments, the slot type configuration nay include at least one condition. According to other example embodiments, the slot type configuration may include at least a bitmap. In certain example embodiments, the first bandwidth communication may include a narrowband communication or a wideband communication, and the second bandwidth communication may include the wideband communication or the narrowband communication. In some example embodiments, the method may also include transmitting a request for switching between the narrowband communication and the wideband communication. In some example embodiments, the request for switching between the narrowband communication and the wideband communication may include one of at least a connection setup request, a connection resume request, and a reconfiguration request. In other example embodiments, the data communication may be performed using the second bandwidth communication for a predetermined time, and the method may further include switching from using the second bandwidth communication to using the first bandwidth communication upon expiration of the predetermined time.

According to certain example embodiments, the method may further include extending the predetermined time when there is data communication or scheduling of data communication within the pre-determined time. According to some example embodiments, the at least one condition may be different between a physical downlink shared channel and a physical uplink shared channel According to other example embodiments, the at least one condition may be based on one of at least a transmission of a scheduling request, a connected mode discontinuous reception cycle, and an indication in a downlink control information. In certain example embodiments, data communication with the first bandwidth communication may be defined by a control resource set. In some example embodiments, the method may also include determining an equivalent physical uplink shared channel frequency range based on the control resource set. In other example embodiments, the method may further include determining an equivalent physical downlink shared channel frequency range, wherein the equivalent physical downlink shared channel frequency range may be the same as a frequency range of the control resource set, or may be determined from the frequency range of the control resource set.

Figure 6:
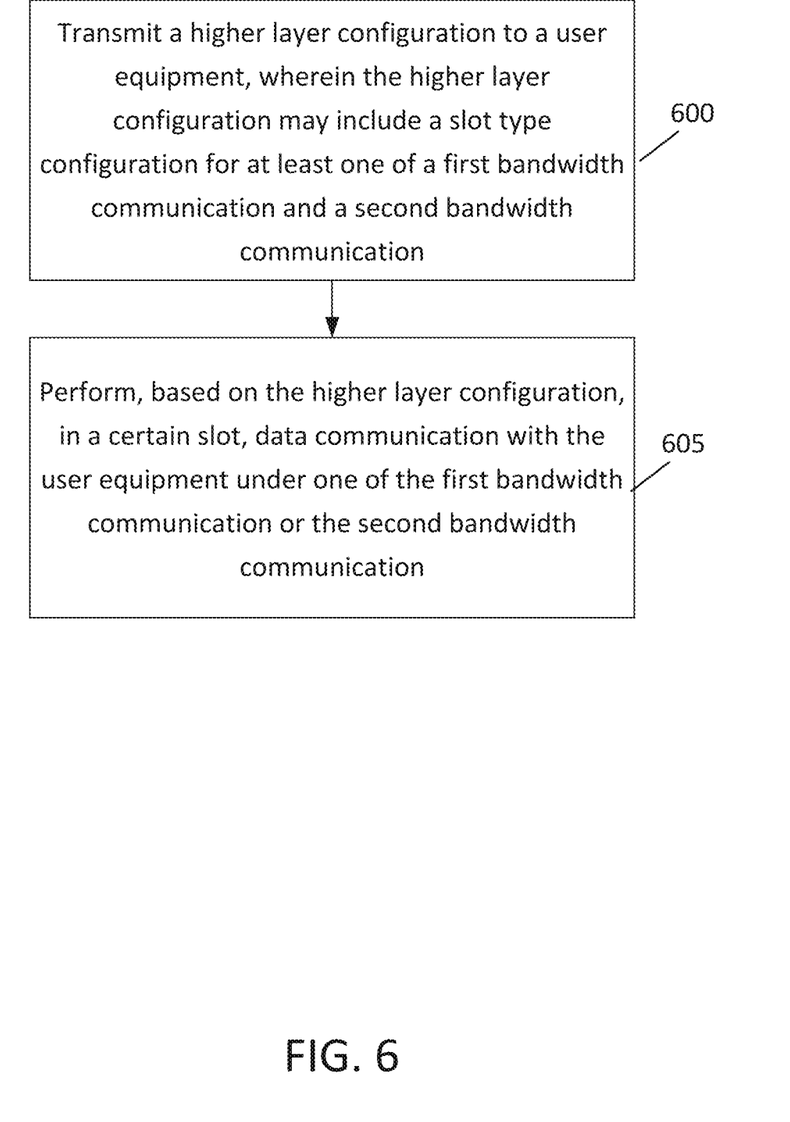
FIG. 6 illustrates an example flow diagram of another method, according to certain example embodiments.

FIG. 6 illustrates an example flow diagram of another method, according to certain example embodiments. In an example embodiment, the method of FIG. 6 may be performed by a network entity, or a group of multiple network elements in a 3GPP system, such as LTE or 5G-NR. For instance, in an example embodiment, the method of FIG. 6 may be performed by a gNB similar to one of apparatuses 10 or 20 illustrated in FIGS. 7(a) and 7(b).

According to certain example embodiments, the method of FIG. 6 may include, at 600, transmitting a higher layer configuration to a user equipment, wherein the higher layer configuration comprises a slot type configuration for at least one of a first bandwidth communication and a second bandwidth communication. At 605, the method may include performing, based on the higher layer configuration, in a certain slot, data communication with the user equipment under one of the first bandwidth communication or the second bandwidth communication.

According to certain example embodiments, the higher layer configuration may include at least one of a connection setup configuration, a connection resume configuration, and a reconfiguration. According to some example embodiments, the slot type configuration may include at least one condition. According to other example embodiments, the slot type configuration may include at least a bitmap. In certain example embodiments, the data communication may be performed using the second bandwidth communication for a predetermined time. In some example embodiments, the method may further include switching from using the second bandwidth communication to using the first bandwidth communication upon expiration of the predetermined time.

In certain example embodiments, the first bandwidth communication may include a narrowband communication or a wideband communication, and the second bandwidth communication may include the wideband communication or the narrowband communication. In some example embodiments, the at least one condition may be different between a physical downlink shared channel and a physical uplink shared channel In other example embodiments, the at least one condition is based on one of at least a transmission of a scheduling request, a connected mode discontinuous reception cycle, and an indication in a downlink control information. According to some example embodiments, data communication with the narrowband communication may be defined by a control resource set.

FIG. 7(a) illustrates an apparatus 10 according to certain example embodiments. In certain example embodiments, apparatus 10 may be a node or element in a communications network or associated with such a network, such as a UE, mobile station, mobile device, stationary device, or other device. It should be noted that one of ordinary skill in the art would understand that apparatus 10 may include components or features not shown in FIG. 7(a).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 7(a).

As illustrated in the example of FIG. 7(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7(a), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-5.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-5.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to receive a higher layer configuration from a network element. According to certain example embodiments, the higher layer configuration may include a slot type configuration for at least one of a first bandwidth communication and a second bandwidth communication. Further, apparatus 10 may be controlled by memory 14 and processor 12 to perform, based on the higher layer configuration, in a certain slot, data communication with the network element under one of the first bandwidth communication or the second bandwidth communication.

FIG. 7(b) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 7(b).

As illustrated in the example of FIG. 7(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7(b), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-4, and 6.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-4, and 6.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

For instance, in certain example embodiments, apparatus 20 may be controlled by memory 24 and processor 22 to transmit a higher layer configuration to a user equipment. According to certain example embodiments, the higher layer configuration may include a slot type configuration for at least one of a first bandwidth communication and a second bandwidth communication. Further, apparatus 20 may be controlled by memory 24 and processor 22 to perform, based on the higher layer configuration, in a certain slot, data communication with the user equipment under one of the first bandwidth communication or the second bandwidth communication.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for receiving a higher layer configuration from a network element. According to certain example embodiments, the higher layer configuration may include a slot type configuration for at least one of a first bandwidth communication and a second bandwidth communication. The apparatus may also include means for performing, based on the higher layer configuration, in a certain slot, data communication with the network element under one of the first bandwidth communication or the second bandwidth communication.

Certain example embodiments may also be directed to an apparatus that includes means for transmitting a higher layer configuration to a user equipment. According to certain example embodiments, the higher layer configuration may include a slot type configuration for at least one of a first bandwidth communication and a second bandwidth communication. The apparatus may also include means for performing, based on the higher layer configuration, in a certain slot, data communication with the user equipment under one of the first bandwidth communication or the second bandwidth communication.

Certain example embodiments described herein provide several technical improvements, enhancements, and/or advantages. In some example embodiments, it may be possible to provide a power saving method such that the UE using reduced BW may be configured to use large BW in UL/DL for faster transmission/reception.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

3GPP 3rd Generation Partnership Project
5G 5th Generation
5GCN 5G Core Network
ACK Acknowledge
BS Base Station
BW Bandwidth
BWP Bandwidth Part
CORESET Control Resource set
DCI Downlink Control Information
DL Downlink
DRX Discontinuous Reception
eNB Enhanced Node B
FR1 Frequency Range 1
FR2 Frequency Range 2
gNB 5G or Next Generation NodeB
LTE Long Term Evolution
NR New Radio
PDCCH Physical Downlink Control Channel
PDSCH Physical Downlink Shared Channel
PUCCH Physical Uplink Control Channel
PUSCH Physical Uplink Shared Channel
RedCap Reduced Capability
RRC Radio Resource Control
RS Reference Signals
SR Scheduling Request
SSB Synchronization Signal Block
UE User Equipment
UL Uplink

We claim:

1. An apparatus, comprising:
at least one processor; and
at least one memory comprising computer program code,
the at least one memory and the computer program code are configured, with the at least one processor, to cause the apparatus at least to
receive a higher layer configuration from a network element, wherein the higher layer configuration comprises a slot type configuration for at least one of a first bandwidth communication and a second bandwidth communication; and
perform, based on the higher layer configuration, in a certain slot, data communication with the network element under one of the first bandwidth communication or the second bandwidth communication,
wherein the slot type configuration comprises at least a bitmap.

2. The apparatus according to claim 1, wherein the higher layer configuration comprises at least one of a connection setup configuration, a connection resume configuration, and a reconfiguration.

3. An apparatus, comprising:
at least one processor; and
at least one memory comprising computer program code,
the at least one memory and the computer program code are configured, with the at least one processor, to cause the apparatus at least to
receive a higher layer configuration from a network element, wherein the higher layer configuration comprises a slot type configuration for at least one of a first bandwidth communication and a second bandwidth communication;
perform, based on the higher layer configuration, in a certain slot, data communication with the network element under one of the first bandwidth communication or the second bandwidth communication; and
transmit a request for switching between the narrowband communication and the wideband communication,
wherein the first bandwidth communication comprises a narrowband communication or a wideband communication, and the second bandwidth communication comprises the wideband communication or the narrowband communication, and
wherein the request for switching between the narrowband communication and the wideband communication comprises one of at least a connection setup request, a connection resume request, and a reconfiguration request.

4. The apparatus according to claim 3,
wherein the data communication is performed using the second bandwidth communication for a predetermined time, and
wherein the at least one memory and the computer program code are further configured, with the at least one processor, to cause the apparatus at least to switch from using the second bandwidth communication to using the first bandwidth communication upon expiration of the predetermined time.

5. The apparatus according to claim 4, wherein the at least one memory and the computer program code are further configured, with the at least one processor, to cause the apparatus at least to:
extend the predetermined time when there is data communication or scheduling of data communication within the pre-determined time.

6. An apparatus, comprising:
at least one processor; and
at least one memory comprising computer program code,
the at least one memory and the computer program code are configured, with the at least one processor, to cause the apparatus at least to
receive a higher layer configuration from a network element, wherein the higher layer configuration comprises a slot type configuration for at least one of a first bandwidth communication and a second bandwidth communication; and
perform, based on the higher layer configuration, in a certain slot, data communication with the network element under one of the first bandwidth communication or the second bandwidth communication,
wherein the slot type configuration comprises at least one condition, and
wherein the at least one condition is different between a physical downlink shared channel and a physical uplink shared channel.

7. The apparatus according to claim 6, wherein the at least one condition is based on one of at least:
a transmission of a scheduling request,
a connected mode discontinuous reception cycle, and
an indication in a downlink control information.

8. The apparatus according to claim 1, wherein data communication with the first bandwidth communication is defined by a control resource set.

9. The apparatus according to claim 8, wherein the at least one memory and the computer program code are further configured, with the at least one processor, to cause the apparatus at least to:
determine an equivalent physical uplink shared channel frequency range based on the control resource set.

10. The apparatus according to claim 8, wherein the at least one memory and the computer program code are further configured, with the at least one processor, to cause the apparatus at least to:
determine an equivalent physical downlink shared channel frequency range,
wherein the equivalent physical downlink shared channel frequency range is the same as a frequency range of the control resource set, or is determined from the frequency range of the control resource set.

11. An apparatus, comprising:
at least one processor; and
at least one memory comprising computer program code,
the at least one memory and the computer program code are configured, with the at least one processor, to cause the apparatus at least to
transmit a higher layer configuration to a user equipment, wherein the higher layer configuration comprises a slot type configuration for at least one of a first bandwidth communication and a second bandwidth communication; and
perform, based on the higher layer configuration, in a certain slot, data communication with the user equipment under one of the first bandwidth communication or the second bandwidth communication,
wherein the slot type configuration comprises at least a bitmap.

12. The apparatus according to claim 11, wherein the higher layer configuration comprises at least one of a connection setup configuration, a connection resume configuration, and a reconfiguration.

13. The apparatus according to claim 11, wherein the first bandwidth communication comprises a narrowband communication or a wideband communication, and the second bandwidth communication comprises the wideband communication or the narrowband communication.

14. An apparatus, comprising:
at least one processor; and
at least one memory comprising computer program code,
the at least one memory and the computer program code are configured, with the at least one processor, to cause the apparatus at least to
transmit a higher layer configuration to a user equipment, wherein the higher layer configuration comprises a slot type configuration for at least one of a first bandwidth communication and a second bandwidth communication; and
perform, based on the higher layer configuration, in a certain slot, data communication with the user equipment under one of the first bandwidth communication or the second bandwidth communication,
wherein the slot type configuration comprises at least one condition, and
wherein the at least one condition is different between a physical downlink shared channel and a physical uplink shared channel.

15. The apparatus according to claim 14, wherein the at least one condition is based on one of at least:
a transmission of a scheduling request,
a connected mode discontinuous reception cycle, and
an indication in a downlink control information.

* * * * *